US012083073B2

(12) United States Patent
Vaserman

(10) Patent No.: US 12,083,073 B2
(45) Date of Patent: Sep. 10, 2024

(54) UNIDIRECTIONAL VALVE FOR PRESSURIZED CONTAINERS

(71) Applicant: Elchanan Vaserman, Jerusalem (IL)

(72) Inventor: Elchanan Vaserman, Jerusalem (IL)

(*) Notice: Subject to any disclaimer, the term of this patent is extended or adjusted under 35 U.S.C. 154(b) by 338 days.

(21) Appl. No.: 17/095,791

(22) Filed: Nov. 12, 2020

(65) Prior Publication Data

US 2021/0283020 A1 Sep. 16, 2021

Related U.S. Application Data

(63) Continuation of application No. 16/001,963, filed on Jun. 7, 2018, now abandoned, which is a continuation of application No. 14/758,567, filed as application No. PCT/IL2013/051070 on Dec. 26, 2013, now abandoned.

(30) Foreign Application Priority Data

Dec. 31, 2012 (IL) ........................................ 224061

(51) Int. Cl.
*A61J 11/00* (2006.01)
*A61J 9/00* (2006.01)

(52) U.S. Cl.
CPC .......... *A61J 11/002* (2013.01); *A61J 11/0015* (2013.01); *A61J 9/005* (2013.01); *A61J 11/0065* (2013.01)

(58) Field of Classification Search
CPC ...... A61J 11/002; A61J 11/0015; A61J 9/005; A61J 11/0065
See application file for complete search history.

(56) References Cited

U.S. PATENT DOCUMENTS

| | | | | |
|---|---|---|---|---|
| 15,192 | A | 6/1856 | Peale | |
| 981,072 | A | 9/1909 | Decker | |
| 2,025,508 | A | 12/1934 | Herstein | |
| 2,446,451 | A * | 8/1948 | Allen | A61J 9/005 215/11.1 |
| 2,497,198 | A * | 2/1950 | Allen | A61J 9/005 215/11.1 |
| 3,139,064 | A * | 6/1964 | Guy | A61J 11/001 215/11.1 |
| 4,320,833 | A | 3/1982 | Bass | |
| 5,035,340 | A | 7/1991 | Timmons | |
| 5,601,207 | A | 2/1997 | Pocanzy | |
| 5,797,505 | A | 8/1998 | Kaura | |
| 6,672,479 | B2 | 1/2004 | Shiraishi | |

(Continued)

*Primary Examiner* — Tri M Mai
(74) *Attorney, Agent, or Firm* — Rachel Teitelbaum

(57) ABSTRACT

In a nipple for a baby feeding container, a valve part is disclosed, comprising a unidirectional valve formed of a pliable material and oppositely oriented such that when attached to the container a normal fluid flow through the valve is into the container while a flow from the container to the outside is normally blocked, the valve is characterized by a plurality of normally closed non intersecting slits formed in a deformable wall which blocks the flow of liquid from the container to the outside unless when the slits become temporarily distorted by the natural mouth maneuverings of a baby. The valve is especially advantageous for use in baby feeding containers of inflatable type in which the liquid content is pressurized under the pressure exerted by the stretched elastomeric walls of the container.

8 Claims, 3 Drawing Sheets

(56) References Cited

U.S. PATENT DOCUMENTS

| | | | |
|---|---|---|---|
| 6,994,225 | B2 | 2/2006 | Hakim |
| 7,637,383 | B2 | 12/2009 | Schlumpf |
| 7,959,614 | B2 | 6/2011 | Dikeman |
| 2002/0063103 | A1 | 5/2002 | Kiernan |
| 2002/0121530 | A1 | 9/2002 | Socier |
| 2007/0102388 | A1 | 5/2007 | Lewis |
| 2012/0043293 | A1 | 2/2012 | Bryan |

* cited by examiner

UNIDIRECTIONAL VALVE FOR PRESSURIZED CONTAINERS

CROSS REFERENCE TO RELATED APPLICATIONS

This application is a continuation of U.S. application Ser. No. 16/001,963, filed Jun. 7, 2018, which is a continuation of U.S. application Ser. No. 14/758,567, which is a 371 National Stage filing of PCT International Application Number PCT/IL2023/051070, filed Dec. 26, 2013, which claims the benefit of priority of Israel Patent Application Serial Number 224061, filed on Dec. 31, 2012, the contents of all these which are incorporated by reference in their entirety herein.

FIELD OF THE INVENTION

The present invention is in the field of valves for baby feeding devices.

BACKGROUND OF THE INVENTION

Baby feeding bottles in use today are in the form of rigid containers made of polymeric materials. They comprise a teat and screw closure over a top opening through which liquid nutrition content can be filled when the closure is taken off. One known problem associated with such bottles is that during the feeding process there is a build up of vacuum inside due to volumes of liquid exiting the bottle for consumption without simultaneously being exchanged by similar volumes of air. This vacuum complicates the feeding process, distracts its continuity and upsets the baby. A number of solutions to this problem have been suggested, one of which is the use of inflatable containers that automatically adapt their volume to the volume of their liquid content, as disclosed by WO2006129302. Elastomeric balloon-like containers as suggested by WO2006129302 require special arrangements in the nipple, for preventing uncontrolled leakage of liquid from the container through the nipple under the pressure exerted on the liquid content by the stretched balloon-like container's wall. Four alternative valve arrangements that shut the nipple against uncontrolled leakage while allowing flow of the nursing liquid under the natural nursing actions of a baby are disclosed by WO2006129302. Three of said four alternative arrangements share the common attribute that the pressure exerted by the contained liquid on the valve tends to open the valve, while leak of the liquid is prevented due a predetermined resistance of the valve to the liquid pressure. No leakage will occur whenever the valve's resistance is sufficiently greater so as to overcome the internal liquid pressure. When the natural nursing actions of a baby cooperate with the internal liquid pressure to increase the pressure on the valve beyond its predetermined threshold of resistance, the valve opens and liquid is released through. In the embodiment illustrated by FIGS. 3 and 4 of WO2006129302, part 51 of the pneumatic actuator 50 cooperates with the internal liquid pressure for lifting the flap 44 upon squeezing of the actuator 50 by the gums of a nursing baby. In the embodiment illustrated by FIG. 5 of WO2006129302, suction by a nursing baby cooperates with the internal liquid pressure for lifting the element 56 against the biasing force of spring 63. In the embodiment illustrated by FIGS. 10 to 12 of WO2006129302 suction applied by a nursing baby cooperates with the internal liquid pressure for distorting the valve's cover 104 into central cavity 106, thereby exposing the apertures 100 to the internal liquid.

SUMMARY OF THE INVENTION

In a first broad aspect the invention relates to the recognition of a most appropriate valve type for use in baby feeding devices of the type comprising inflatable container. In this regard it is suggested by the inventor of the present invention that inclusion of an oppositely oriented unidirectional valve in the liquid outlet of a baby feeding device of the type comprising inflatable container is the most advantageous way for preventing undesired leaks from the container.

Principally, any type of unidirectional valve that can temporarily loss its sealing property (either by the operation of an actuator, or by distortion of its normal shape) in response to natural mouth maneuverings of a baby during bottle-feeding, can be adopted for use in the balloon-like container suggested by WO2006129302. In the context of the present invention the term "unidirectional valve" refers to a valve designed to open whenever the fluid pressure directed from a fluid inlet of the valve towards a fluid outlet thereof is greater from a predetermined threshold value, wherein fluid pressure in the opposite direction tends to close the valve more firmly than in the absence of any directional pressure. According to the present invention the unidirectional valve should, however, be oriented in the nipple as if to allow liquid flow from outside into the container, i.e. oppositely to its natural orientation (considering the purpose of the container to let its content out for feeding a baby). The same valve can thus, at least principally, be used also for pre use introduction of liquid content into the container, by forcing the liquid through the valve by a pressure sufficiently greater for overcoming the resistance of the elastomeric container's wall to be stretched.

A main advantage of such valve once put to use in an inflatable container e.g. of the type suggested by WO2006129302 is that the liquid pressure exerted on the liquid content by the balloon-like stretched wall will tend to close the valve thus securing it against leakage better than what provided by any of the three valve arrangements originally suggested by said document, arrangements in which the internal liquid pressure tends to open the valve.

Reference is made hereby to FIG. 4 of U.S. Pat. No. 5,035,340 in which a nipple for baby bottle is suggested, comprising a dome shaped unidirectional valve. The valve construction comprises two intersecting slits formed in a dome shaped wall, such that an opening normally closed by four flaps is created in the center of the domed wall. The valve is placed oppositely in the bottle's nipple, i.e. with the convex side of the dome facing the contained liquid such that the more the weight of the liquid inside the bottle presses on the valve (e.g. when the bottle is maintained upside down), more tightly the four flaps become together, thus more tightly the valve becomes closed. The build-up of vacuum inside the bottle is limited, however, because the valve functions as a unidirectional, allowing entrance of air from outside when the atmospheric pressure is greater than the pressure inside the bottle. The valve lets the liquid content out when distorted in response to natural mouth maneuverings of a baby during bottle-feeding. Unfortunately, the valve suggested by U.S. Pat. No. 5,035,340 cannot be fully recommended for use in inflatable containers of the type disclosed by WO2006129302, because the internal liquid pressure in such containers is substantially greater than in the conventional ones towards which the invention of U.S. Pat. No. 5,035,340 is aimed. While in conventional containers the pressure on the valve results from the liquid weight, in inflatable containers it mainly results from the pressure exerted on the liquid by the stretched container's wall. When turned upside down, the liquid weight adds up to the already existing wall stretching pressure. This greater total pressure requires better sealing properties than can be achieved by the oppositely placed unidirectional valve disclosed by U.S. Pat. No. 5,035,340. Furthermore, in order to minimize leaks, a valve for the inflatable container type of WO2006129302 needs a better reliability and a faster response than provided by the valve of U.S. Pat. No. 5,035,340 in returning to a sealing state from the distorted open state caused by the natural mouth maneuverings of a baby during bottle-feeding. Unfortunately, in case the valve of U.S. Pat. No. 5,035,340 is adopted for inflatable container of the type presented by WO2006129302, the pressurized reverse flow forced through the valve by the thrust provided by the inflatable container, and/or the internal liquid pressure maintained in the inflatable container, may prevent one or more of the valve flaps from retracting to its regular undistorted position upon release of the baby's mouth pressure, thus leaving the valve partially open i.e. with one or more of the flaps remaining over bent towards a reverse flow permitting position. The above discussed issues mutatis mutandis apply also to a three slit triple flapped unidirectional valve disclosed by DE63500 that is similar in operation and in drawbacks to the valve of U.S. Pat. No. 5,035,340. A cone shaped valve of the type disclosed in FIG. 8 of WO2006129302 may provide for a better resistance against over bending of the flaps than provided by the valves suggested by U.S. Pat. No. 5,035,340 and DE63500, since the angle between opposing wall segments is sharper in a cone than in a dome, thus in a conically shaped valve each segment (flap) more effectively opposes over bending of either facing or juxtaposed flaps. Yet, actual experiments performed by the inventor reveal that commercialization of inflatable baby feeding containers will be more successful if more perfect and reliable sealing properties than can be attained by the conical valve suggested by WO2006129302 will be developed without losing simplicity.

The problems associated with unidirectional valves based on the aforementioned types when used in inflatable containers are solved by a second aspect of the invention, relating to a nipple for baby feeding containers, the nipple comprising a unidirectional valve oriented with a convexity of a deformable curved wall thereof (e.g. a domed wall or a conic wall) facing the container's hollow, said valve is characterized by at least two non intersecting slits formed in the deformable curved wall, which through said slits liquid can controllably flow. Due to the fact that the slits do not intersect, the valve closure means is flap free, interference between the function of the slits is avoided, and the transformation of each slit from a distorted open state to a normal close state and vise versa is substantially independent of the state of the other slits.

Preferably, the unidirectional valve is flap free, i.e. free of flaps resulting from its slits design. This can be achieved by avoiding intersection between valve's slits and by forming each slit free of substantial internal bending, and preferably as straight as possible (i.e. following a geodesic line of the curved wall).

The invention thus concern a part in a nipple for a baby feeding container, which comprises a unidirectional valve formed of a pliable material and oppositely oriented such that when attached to the container a normal fluid flow through the valve is into the container while a flow from the container to the outside is normally blocked, the valve is characterized by at least two normally closed non intersecting slits providing for reverse liquid flow, i.e. from the container to the outside, upon distortion of the slits by natural mouth maneuverings of a baby.

In various embodiments of the present invention the slits are formed in a deformable and preferably curved wall disposed substantially transversely to the intended direction of liquid flow through the valve. Preferably, in preferred embodiments of the invention in which said wall is curved, a convexity of the curved wall is arranged to face a container's hollow when the nipple is attached to the container. In preferred embodiments of the invention the curved wall is has a dome like shape (referred to hereinafter as 'domed'). In alternative embodiments of the invention the curved wall is of conic shape.

In various preferred embodiments the slits are located in respective bulged regions formed (e.g. for reinforcement) in the deformable valve wall.

In various preferred embodiments of the present invention the curved wall of the valve is of rotational symmetry and is preferably positioned with its axis of symmetry substantially parallel to or being a longitudinal axis of symmetry of the nipple. Preferably, the slits are angularly spaced about a center of symmetry of said deformable transversely disposed wall, preferably in substantially equal spaces.

In various embodiments of the invention at least three non intersecting angularly spaced slits are provided for allowing liquid flow upon distortion of at least one slit by natural mouth maneuverings of a baby (when said at least one slit is occasionally and/or intentionally oriented substantially perpendicularly to the gums of the baby), the slits are diverging from near a mid point of a transversely disposed deformable wall towards a circumference thereof.

In various preferred embodiments of the invention at least part of the slits differ in length, thereby allowing to change the flow rate of liquid from the container to a baby's mouth by rotating the container such that a slit of a desired length (thus providing for a respectively desired opening size upon distortion) will be oriented substantially perpendicularly to the gums of the baby.

In a preferred embodiment of the invention three non intersecting angularly spaced slits are provided, diverging from near an apex of the convexity of the curved wall towards a circumference thereof.

In yet farther aspects of the invention the oppositely oriented unidirectional valve according to the invention can be used also for controlling fluid flow through a pacifier in which it is mounted, as well as for manually or mechanically controlling the flow of fluids from containers in uses other than for baby feeding, in which the fluids are maintained under pressure, including flexible and/or inflatable elastomeric containers maintained under fixed or variable external pressure.

DETAILED DESCRIPTION OF THE INVENTION

The present invention will be further explained by the accompanying Figures. With specific reference now to the figures in detail, it is stressed that the particulars shown are by way of example and for purposes of illustrative discussion of one or more preferred embodiments of the present invention, and are presented in the cause of providing what believed to be the most useful and readily understood description of the principles and conceptual aspects of the invention. In this regard, no attempt is made to show in the figures structural details of the invention in more detail than necessary for understanding the basics of the invention, the description taken with the drawings making apparent to those skilled in the art how several forms of the invention may be embodied in practice.

DETAILED DESCRIPTION OF THE FIGURES

It will be evident to those skilled in the art that the invention is not limited to the details of the foregoing illustrative embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Figure 4:
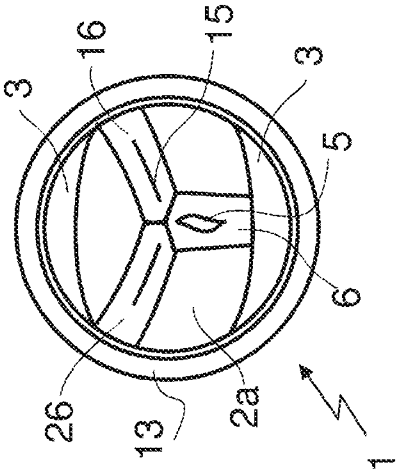
FIG. 4 illustrates the valved nipple part of FIG. 1 as seen from its liquid inlet side when distorted by squeezing it vertically in a mid portion of its length, e.g. by the natural mouth maneuverings of a baby during bottle-feeding.
Figure 5:
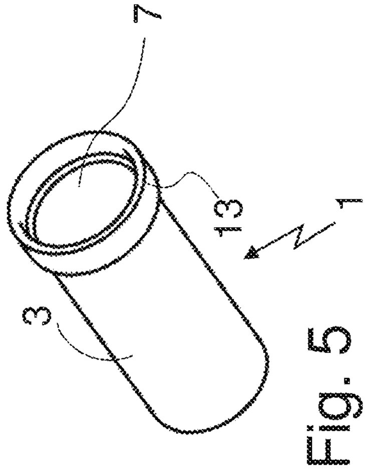
FIG. 5 illustrates the valved nipple part of FIGS. 1 and 6 in perspective view showing its length and its liquid inlet opening.
Figure 8:
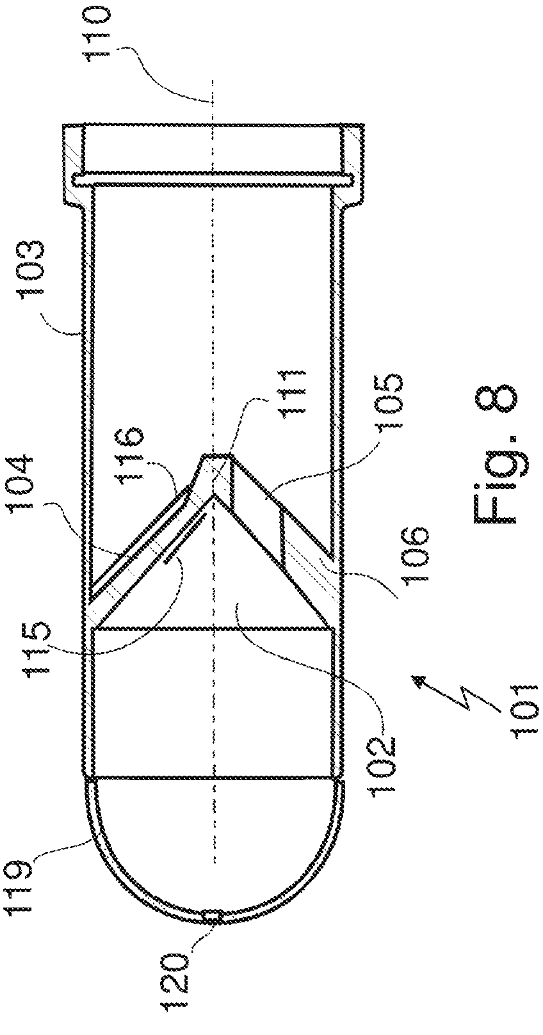
FIG. 8 illustrates a longitudinal cross section of a variation of the valved nipple part of FIG. 1, differing from the embodiment of FIG. 1 in that the curved wall of the valve is conic rather than domed, and in that it comprises an integral domed nipple edge.

FIG. 5 illustrates a perspective view of a valved nipple part (1) according to the present invention. At least the valved part of the nipple is formed of a pliant material such as silicon rubber, and comprises a hollow cylindrical wall (3) constituting a nipple's neck within which a unidirectional dome shaped valve (4) (shown by FIGS. 1 to 4) is formed from the same piece of material. For concentrating smoothening and regulating the flow of liquid from the valve (4) into the mouth of a baby user the valved nipple part (1) may be further provided with a domed edge (119) having an aperture (120) at its center as shown in the embodiment of FIG. 8. The provision of a domed edge such as (119) of FIG. 8 can be achieved e.g. by snugly fitting the entire valved nipple part (1) into a hollow of a cylindrical neck of a conventional baby feeding nipple (not illustrated) such that the convexity of the dome shaped valve (4) will be facing the inflatable container to which the nipple is to be attached. Alternatively, a domed edge such as (119) of FIG. 8 can be integrated with a valve part (1) according to the invention by any acceptable production method.

The valve comprises a domed wall (4) having three through slits (5) (15) (25) angularly spaced about the apex point (11) of its convexity (2*a*).

The unidirectional valve domed wall (4) is oriented within the nipple's neck (3) such that its concaved side (2) is facing the liquid outlet opening (9) of the nipple (1), and its convexity (2*a*) facing the liquid inlet opening (7) of the nipple (1). A cylindrical widening (13) extending from the nipple's neck (3) and having an inner circumferential groove (8) at the liquid inlet of the nipple (1) allow for fixing the nipple to a matching cylindrical protrusion located at the liquid outlet of a baby feeding container (not shown), e.g. inflatable container of the type suggested by WO2006129302. As can be appreciated, when liquid from such baby feeding container is pressurized against the convexity (2*a*) of the domed wall (4), the domed wall tends to contract, thereby tightening and closing the slits (5) (15) (25) and preventing the liquid from leaking through. Contrarily, if liquid is pressurized from outside the container against the concavity (2) of the domed wall (4), the domed wall tends to extract, thereby loosening and widening the slits (5) (15) (25) and permitting the liquid to freely flow through, from outside into the container.

Considering the purpose of the container to let its content out for feeding a baby, the orientation of the valve (4) within the nipple (1) is opposite to natural, i.e. it is oppositely oriented within the nipple. The increasing resistance of the valve (4) against reverse flow as the pressure from its convex side increases, is thus advantageous for preventing leakage from inflatable containers of the type disclosed by WO2006129302 in which the contained liquid is maintained in some high over atmospheric pressure. Reverse flow is permitted however through the valve (4) upon distortion of the valve during bottle-feeding of a baby due to the natural mouth maneuverings of the baby. A distortion of the valve (4) resulting from a temporal squeezing of the nipple's neck (3) is illustrated by FIG. 4. The distortion includes widening of at least one of the slits, depending on the squeezing direction and magnitude. In the illustrated situation the squeezing is vertical along slit (5) causing it to widen such that pressurized liquid will escape through it from the container side to the nipple outlet opening (9) and into the baby's mouth.

In the illustrated embodiment the slits (5) (15) (25) are located in respective bulged regions (6) (16) (26) formed for reinforcement on the convex side (2*a*) of the domed wall (4). In the illustrated embodiment the curved wall (4) of the valve is of rotational symmetry about a longitudinal axis of symmetry (10) of the nipple(1). The slits (5) (15) (25) are angularly spaced about a center of symmetry (11) of the curved wall (4), in substantially equal spaces of 120 degrees each, and are diverging from near the apex of the convexity (2*a*) of the curved wall (4) towards a circumference thereof, thereby guaranteeing effective functionality of liquid release upon squeezing the nipple neck (3) in any occasional direction. Due to the fact that the slits (5) (15) (25) do not intersect, the valve closure is flap free. Furthermore they are substantially straight (i.e. following a geodesic of the dome (4)) and short (in the illustrated embodiment their length is each about 40% of the radius of the dome (4)). Interference between the function of the slits is thus avoided, and the transformation of each slit from a distorted open state to a normal closed state and vise versa is fast, reliable, and substantially independent of the state of the other slits.

Figure 1:
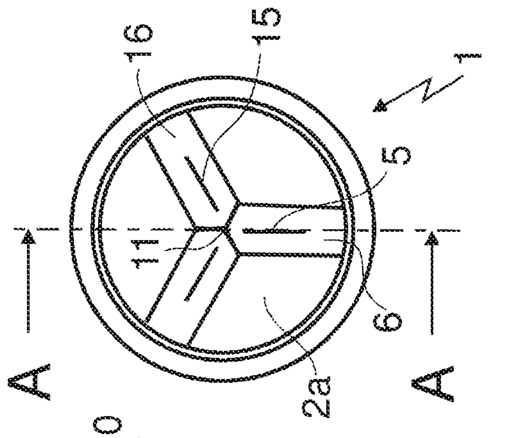
FIG. 1 illustrates a valved nipple part according to the present invention as seen from its liquid inlet side.
Figure 2:
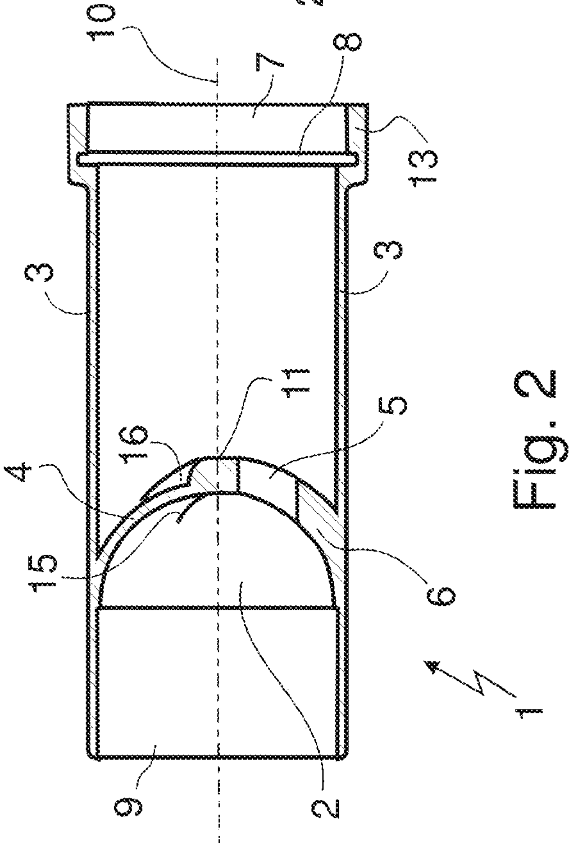
FIG. 2 illustrates a longitudinal cross section of the valved nipple part of FIG. 1, taken through line A-A.
Figure 6:
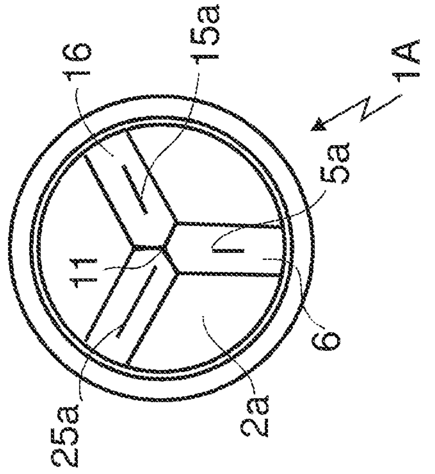
FIG. 6 illustrates a variation of the valved nipple part of FIG. 1, having slits of three different sizes allowing for a selectable liquid flow rate.
Figure 7:
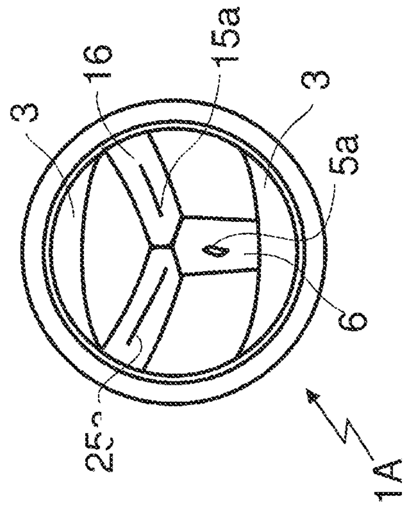
FIG. 7 illustrates the valved nipple part of FIG. 6 as seen from its liquid inlet side when distorted by squeezing it vertically in a mid portion of its length , e.g. by the natural mouth maneuverings of a baby during bottle-feeding.

FIG. 6 illustrates a variation (1A) of the valved nipple part (1) of FIG. 1. This variation differs from the embodiment of FIG. 1 by having slits (5*a*) (15*a*) (25*a*) of three different sizes, respectively, thereby allowing for a selectable liquid flow rate. When the inflatable container to which the valved nipple part (1A) is attached is oriented such that the shortest slit (5*a*) is substantially perpendicular to the gums of a baby user, the slit (5*a*) will be distorted as shown by FIG. 7 upon squeezing, thereby allowing liquid to flow from the container under the pressure of its stretched walls. The flow rate will through it will be smaller however than slit (5) of FIG. 1, since slit (5*a*) is shorter, thus providing for a smaller opening upon distortion. By Rotation of the container so as to bring the mid sized slit (15*a*) or the large sized slit (15*b*) to a perpendicular position respective to the baby's gums, will result with respectively greater flow rates.

FIG. 8 illustrates a longitudinal cross section of a variation (101) of the valved nipple part (1) of FIG. 1, differing from the embodiment of FIG. 1 in that the curved wall (104) of the valve is conic rather than domed, and in that it comprises an integral domed nipple edge (119) having a conventional outlet aperture (120). The conic wall is provided with a plurality of non intersecting slits (105) (115) angularly spaced about a top (111) of the cone shaped wall (104) and symmetrically distributed about a longitudinal axis (111) of the valved nipple part (101). The slits are preferably formed in respective bulged regions (106) (116) in which the curved wall (104) is thicker than in its other regions (104). As in the embodiment of FIG. 1, a concavity (102) of the conic wall (104) is facing away from the container and toward the liquid outlet aperture (120) which is at the baby user side.

Figure 3:
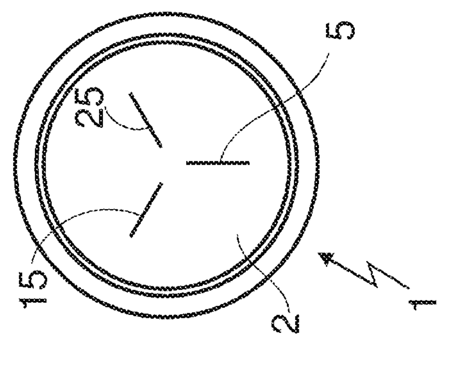
FIG. 3 illustrates the valved nipple part of FIG. 1 as seen from its liquid outlet side.
Figure 9:
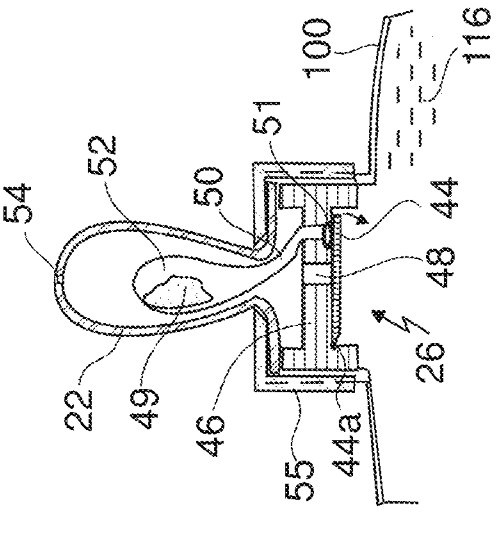
FIG. 9 is a sectional view of a fluid-operated embodiment of a valved nipple according to the invention, shown in its closed state and attached to a baby feeding container.
Figure 10A:
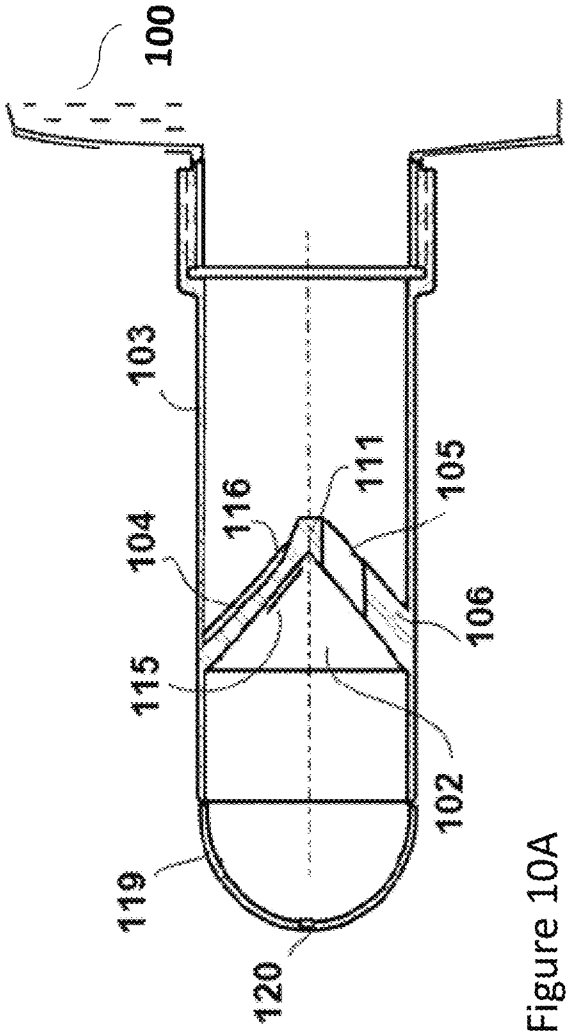
FIG. 10A depicts similarly to FIG. 9, the attachment region of the valved nipple, and FIG. 10B includes an inflated baby container, as described in WO 2006129302.
Figure 10B:
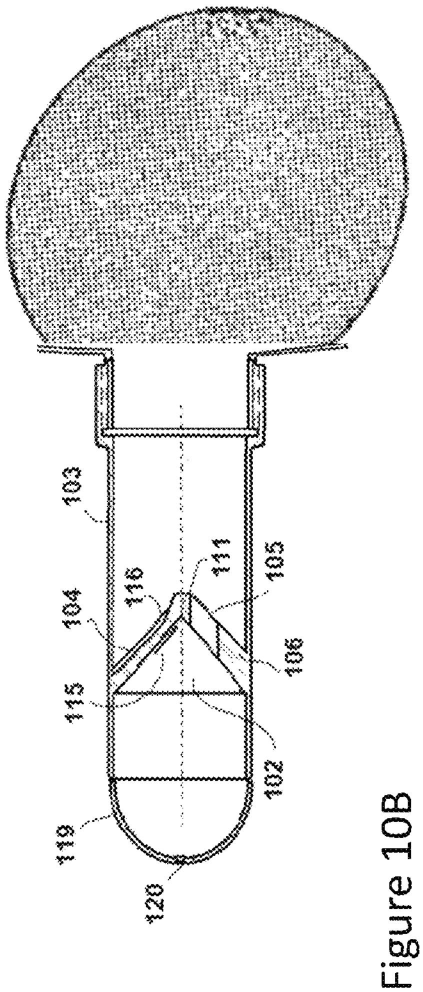
FIG. 10 illustrates a longitudinal cross section of a variation of the valved nipple part in attachment to a baby feeding container.

Another embodiment of a valved nipple according to the present invention is shown in FIG. 9. this embodiment is similar to the embodiment illustrated by FIGS. 3 and 4 of WO2006129302, with the main difference being that in the present invention the valve is positioned reversely, i.e. such that the internal liquid pressure tends to keep the valve closed, thus (oppositely to its functioning in WO2006129302) sealing the container more firmly as the internal liquid pressure increases. The valve (26) is shown in its closed state and attached to a partially illustrated baby feeding container (100) (preferably of the inflatable balloon-like type suggested by WO2006129302) by means of a teat and screw closure (55).

The present embodiment utilizes the biting action of the baby to open the valve (26) which comprises two inter-engaging elements (44) and (46). In the drawing the lower element (44) is a movable flap, biased upwards and hinged at its left extremity (44*a*). The upper element (46) is fixed and provided with an aperture (48), which is normally sealed by the lower flap (44) coming into close contact to the bottom edges of the aperture (48). The flap (44) cannot be over bent to allow reverse flow of liquid from the container to the nipple, since the upper element (46) blocks any further movement of the flap (44) towards beyond its sealing position. Reverse flow through the valve can thus occur only upon actuation by a specially designed actuator e.g. of the type exemplified by the figure and described hereinafter.

A first part (51) of a sealed, partially fluid-filled flexible pneumatic actuator (50) is positioned between the two inter-engaging elements (44) (46). A second part (52) of the actuator (50) extends into the nipple (22). The arrangement is such that a squeezing action on the nipple (22) by a nursing baby displaces fluid within the actuating means (50) to separate the two elements (44) (46) as the first part of the actuator (51) changes from a collapsed state seen in the present figure, to a round state (not illustrated). When the first part of the actuator (51) comes round, it pushes the flap (44) down, i.e. in the direction indicated by the small arrow illustrated near the bottom right of flap (44). This enables fluid (116) to flow under pressure of the inflated container (100) through the aperture (48) into the nipple (22) and out of the nipple opening (54).

As can be seen in FIG. 6, the normally closed position of the lower flap (44) is attained when there is no mechanical pressure on the actuator part (52) and the first part (51) of the actuator is a flat oval as illustrated.

The actuator (50) is preferably filled with water (49) and leaving a small portion of its inner volume for air or an inert gas. The quantity of gas is just sufficient to allow the valve (26) to close under its upwards biasing when no external pressure is applied thereto. Thus when the baby releases pressure on the nipple (22), the part (51) of the actuator disposed between the elements (44) and (46) is pressed between the closed elements to revert to its flat oval form. A light spring (not shown) can optionally be added to increase the upwards biasing so as to improve closure of the valve.

The neck of the nipple (22) can be designed similar to the nipple neck (3) of the embodiment of FIGS. 1-5, and its outlet opening (54) can be wider, similar to the outlet opening (9) of the embodiment of FIGS. 1-5. Differently from the embodiment of FIGS. 3-4 of WO2006129302, the oppositely oriented unidirectional valve (26) according to the present invention can allow pre filling of the container with a pressurized liquid forced into the container (100) through aperture (48). Post filling, the elastomeric walls of container (100) will be stretched and will thus maintain the contained liquid in over atmospheric pressure thereby firmly tightening together the flap (44) to the upper element (46) to prevent uncontrolled leak of the pressurized liquid.

The invention claimed is:

1. A method of concurrently preventing air introduction and preventing liquid leakage from an inflatable baby feeding container comprising elastomeric walls, wherein introduction of a liquid into the inflatable baby feeding container is under an applied force such that the applied force overcomes resistance of the elastomeric container walls, stretching the container walls thereby, said method comprising the step of equipping the inflatable baby feeding container with a nipple comprising a domed edge having an aperture and further comprising a nipple structure a normal flow through the valve is directed into the container; and flow from the container to the outside is normally blocked;

and wherein the valve further comprises at least two normally closed non intersecting slits of different sizes positioned within a convex side of a deformable wall of said dome-shaped unidirectional valve, whereby reverse liquid flow from said inflatable baby feeding container to the outlet is promoted through the natural mouth maneuverings of a baby which distort one of the two normally closed non intersecting slits while resistance of the valve against reverse flow increases as the pressure from said convex side increases, thereby preventing leakage from the inflatable baby feeding container.

2. The method of claim 1, wherein a plurality of slits are formed in and are angularly spaced about a center of symmetry of said deformable wall.

3. The method of claim 2, wherein angular spaces between said slits are substantially equal.

4. The method of claim 1, wherein said non intersecting slits are three angularly spaced slits diverging from near an apex of a convex side of said deformable wall towards a circumference of said valve.

5. The method of claim 1, wherein said non-intersecting slits are three angularly spaced slits diverging from near a mid-point of a convex side of said deformable curved wall towards a circumference of said valve.

6. The method of claim 5, wherein all three non- intersecting slits differ in length.

7. The method of claim 1, wherein said method further comprises the step of orienting the outlet of said inflatable baby feeding container within the mouth of the user to promote distortion of one of the two normally closed non intersecting slits.

8. The method of claim 7, wherein the orienting results in said one of the two normally closed non intersecting slits being positioned substantially perpendicularly to the gums of the baby.

* * * * *